(12) United States Patent
Yamada (10) Patent No.: US 11,415,259 B2
(45) Date of Patent: Aug. 16, 2022

(54) HOLE PLUG FOR WASTE WATER

(71) Applicant: NIFCO INC., Yokosuka (JP)

(72) Inventor: Yoshiaki Yamada, Yokosuka (JP)

(73) Assignee: NIFCO INC., Yokosuka (JP)

( * ) Notice: Subject to any disclaimer, the term of this patent is extended or adjusted under 35 U.S.C. 154(b) by 1000 days.

(21) Appl. No.: 16/138,333

(22) Filed: Sep. 21, 2018

(65) Prior Publication Data

US 2019/0093812 A1 Mar. 28, 2019

(30) Foreign Application Priority Data

Sep. 28, 2017 (JP) .............................. JP2017-188671

(51) Int. Cl.
 *F16L 55/16* (2006.01)

(52) U.S. Cl.
 CPC ................. *F16L 55/1612* (2013.01)

(58) Field of Classification Search
 CPC .................................................. F16L 55/1612
 USPC ....................................................... 220/309.1
 See application file for complete search history.

(56) References Cited

U.S. PATENT DOCUMENTS

| 2006/0220376 | A1* | 10/2006 | Pangallo | ................ | B62D 25/24 285/202 |
|---|---|---|---|---|---|
| 2012/0023715 | A1 | 2/2012 | Nakajima | | |
| 2014/0020770 | A1 | 1/2014 | Son et al. | | |

FOREIGN PATENT DOCUMENTS

| CN | 201544882 | U | | 8/2010 |
|---|---|---|---|---|
| JP | 2006-218927 | A | | 8/2006 |
| JP | 2006218927 | A | * | 8/2006 |
| JP | 4409457 | B2 | | 2/2010 |
| JP | 2010-209923 | A | | 9/2010 |
| JP | 2016-151344 | A | | 8/2016 |
| KR | 970034786 | U | | 7/1997 |
| KR | 20090062294 | A | | 6/2009 |
| KR | 20140012414 | A | | 2/2014 |

* cited by examiner

*Primary Examiner* — Anthony D Stashick
*Assistant Examiner* — James M Van Buskirk
(74) *Attorney, Agent, or Firm* — Manabu Kanesaka (57) ABSTRACT

A hole plug for waste water includes a protruding portion having a flange with a dish shape, and a drain hole therein; and a cylindrical portion projecting from the protruding portion and formed at an inner face side of the flange, the cylindrical portion being configured to be inserted into and pass through an attachment hole of a panel. The cylindrical portion includes an engagement leg provided in a circumference configured to detachably engage the attachment hole, a cylinder inside, and a shielding wall which is positioned above the drain hole, is larger than a horizontal cross-sectional surface of the drain hole, and is provided such that the cylinder inside and the drain hole can communicate with each other for allowing a liquid entering into an inside of a vehicle to flow into the cylinder inside and flow out to an outside of a vehicle from the drain hole.

8 Claims, 10 Drawing Sheets

HOLE PLUG FOR WASTE WATER

BACKGROUND OF THE INVENTION AND RELATED ART STATEMENT

The present invention relates to a hole plug for waste water attached to a vehicle-body-side panel of an automobile and the like for allowing a liquid such as rainwater and the like (for example, the liquid such as rainwater and the like is used in broad meaning including a liquid trapped in a door pocket or a luggage room, and the same shall apply hereinafter) entered into a vehicle to flow out to an outside of the vehicle.

Figure 10A:
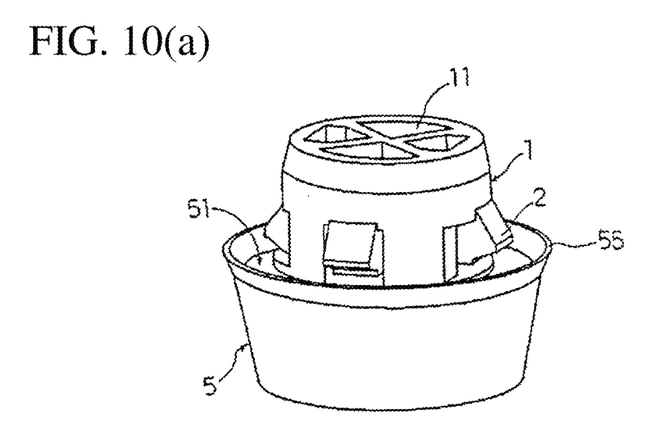
FIGS. 10(a) and 10(b) show a plug for draining water disclosed in the Patent Document 1 (FIG. 1 and FIG. 3 of the Patent Document 1).
Figure 10B:
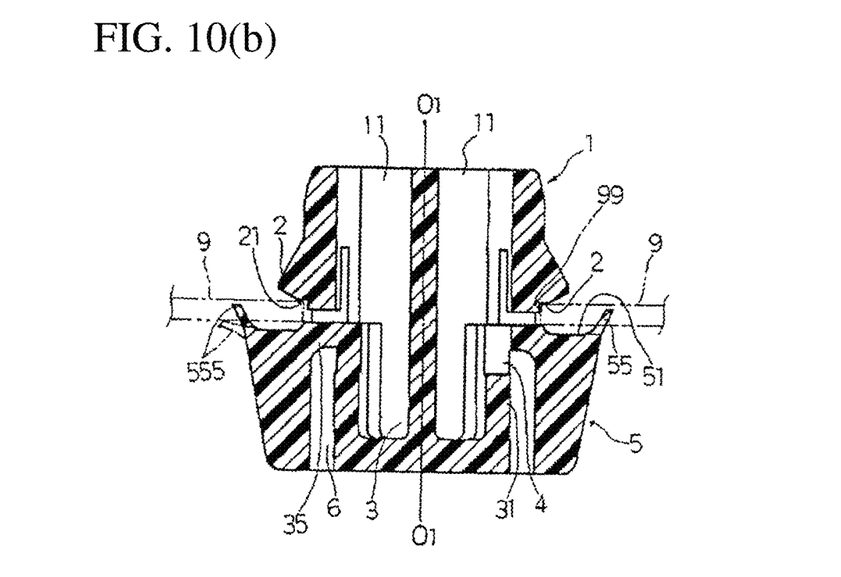

FIGS. 10(a) to 10(c) show a hole plug disclosed in Patent Document 1. The plug structure is formed of a single resin molded article, comprises a cylindrical portion 1 and a cover portion 5 which is a protruding portion, and is attached in a state wherein the cylindrical portion 1 is inserted to pass through an attachment hole 99 of a vehicle-body-side panel 9 so as to flow the liquid such as rainwater and the like entered into the vehicle into a cavity portion 11 inside the cylindrical portion 1, and to flow the liquid inside the cylinder out to the outside of the vehicle through a drainage canal 6 provided in the cover portion 5.

Specifically, the cylindrical portion 1 includes the cavity portion 11 provided in an inside, and an elastically displaceable engagement claw 2 provided on an outer peripheral portion. The cover portion 5 includes a cup-shaped water-trapped portion 3 provided to continue to the cavity portion 11; the drainage canal 6 annularly formed in an outer peripheral portion of the water-trapped portion 3; a communication path 4 communicating the water-trapped portion 3 with the drainage canal 6; and an elastically displaceable fin-like flange portion 55 provided on a side facing the engagement claw 2. The communication path 4 is formed in such a way so as to connect to one portion of the drainage canal 6 near a joint portion between the cavity portion 11 and a space portion forming the water-trapped portion 3. In a use state, the rainwater entering into the inside of the vehicle is drained to a drainage canal 6 side through the communication path 4 from the water-trapped portion 3.

Patent Document 1
   Japanese Patent No. 4409457

SUMMARY OF THE INVENTION

Problems to be Solved by the Invention

In the aforementioned plug structure, the communication path 4 is provided near the joint portion between the cavity portion 11 and the space portion forming the water-trapped portion 3, so that although the water entered into the water-trapped portion 3 is excellently drained to the outside from the drainage canal 6 to a height of the communication path 4, the water trapped relatively on a lower side than the communication path 4 is not drained so as to have a problem such that the water trapped relatively on the lower side might spatter to the inside of the vehicle from the cavity portion 11 due to running vibrations and the like. Also, in car washing, heavy rainfall, and the like, when water enters into the drainage canal 6 from the outside, the water can easily enter into the water-trapped portion 3, and further to a cavity portion 11 side from the communication path 4. In order to suppress entering into a water-trapped portion 3 side from the drainage canal 6, it is effective to increase a projection amount of the cover portion 5 to lengthen the drainage canal 6. However, the larger the projection amount of the cover portion is, the worse the appearance becomes so as to sacrifice a weight reduction.

There, an object of the present invention is to prevent rainwater from entering into the inside of the vehicle from the outside while ensuring an excellent draining performance even if the projection amount to the outside of the vehicle is reduced in an attachment state to a panel.

Further objects and advantages of the invention will be apparent from the following description of the invention.

Means to Solve the Invention

In order to obtain the aforementioned object, the present invention is a hole plug for waste water comprising a protruding portion and a cylindrical portion, and attached in a state wherein the cylindrical portion is inserted to pass through an attachment hole of a vehicle-body-side panel for allowing a liquid such as rainwater and the like entered into an inside of a vehicle to flow into a cylinder inside of the cylindrical portion, and the liquid flowed into the cylinder inside to flow out to an outside of the vehicle from a drain hole provided in the protruding portion. Also, the protruding portion is formed by a flange having an approximately dish shape, with the cylindrical portion projecting on an inner face side of the flange, and includes the drain hole. Also, the cylindrical portion includes an engagement leg provided in a circumference to detachably engage the attachment hole, and a shielding wall positioned directly above the drain hole, larger than a horizontal cross-sectional surface of the drain hole, and provided in a state wherein the cylinder inside and the drain hole can communicate with each other.

The aforementioned present invention is more preferable to be embodied as specified in second to fifth aspects.

(A) An inside of the cylindrical portion and the drain hole are formed in such a way so as to communicate with each other through a communication path located in the cylinder inside of the cylindrical portion, passing between an inner peripheral face and side faces of the shielding wall, and extending to the drain hole through a lower side of the shielding wall (second aspect).

(B) The shielding wall is formed in such a way so as to be provided to have an approximately same height as a cylinder back side of the cylinder inside of the cylindrical portion, or the panel in a state wherein the cylindrical portion engages the attachment hole of the panel through the engagement leg (third aspect).

(C) The engagement leg is formed in such a way so as to be divided through a pair of vertical slits in the cylindrical portion, and such that a tip thereof is connected to the inner face side of the flange (fourth aspect).

(D) The shielding wall is formed in such a way so as to be integrally formed by resin together with the flange and the cylindrical portion (fifth aspect).

Figure 7A:
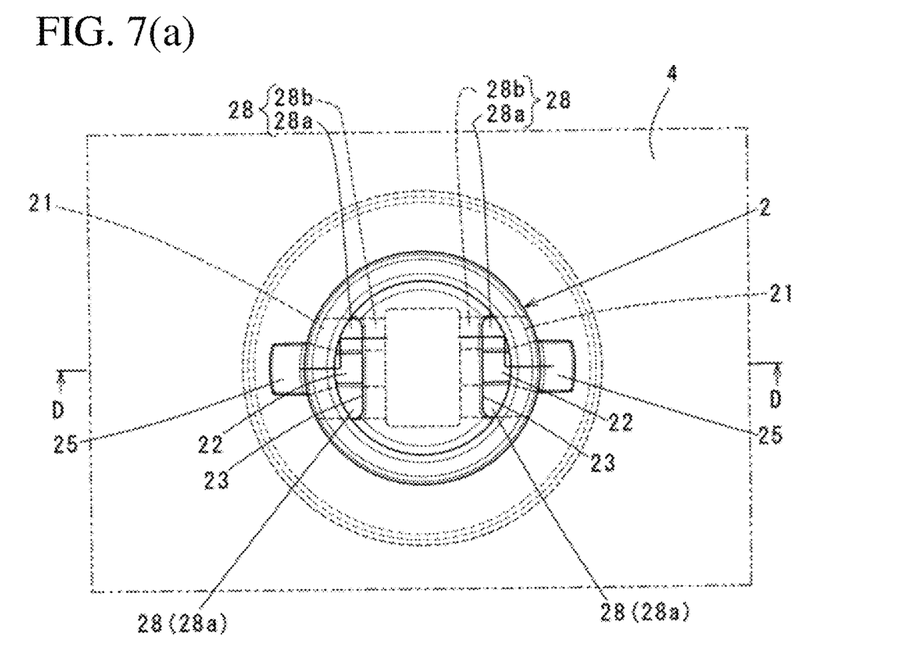
FIG. 7(a) is a drawing viewed from an upper side of a panel.
Figure 7B:
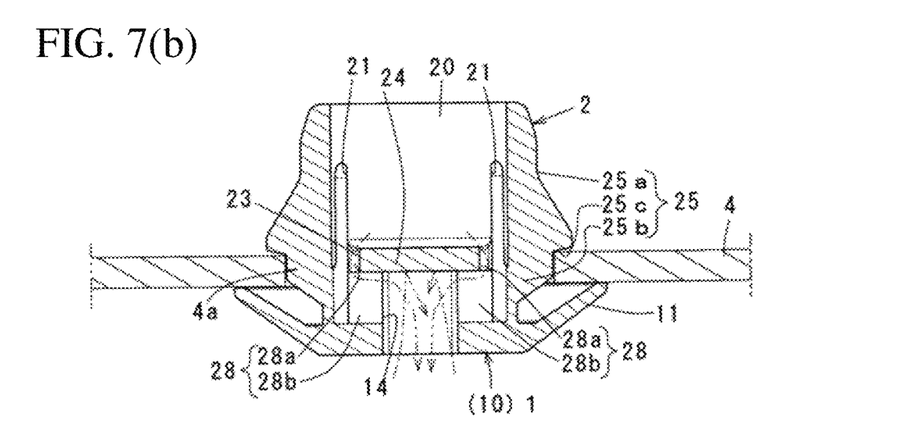
FIG. 7(b) is a cross-sectional view taken along a line D-D in FIG. 7(a)

In the invention according to the first aspect, as shown in FIGS. 7(a) and 7(b), in a use state wherein the panel engages the attachment hole of the panel, the liquid such as rainwater and the like entering into the inside of the vehicle is drained to an outside through the drain hole from the cylinder inside of the cylindrical portion without being obstructed by the shielding wall. Also, in car washing, heavy rainfall, and the like, when water enters into the drain hole from the outside, the water hits the shielding wall provided directly above the drain hole and larger than the horizontal cross-sectional surface of the drain hole, and is repelled so as to suppress water entering into the cylinder inside of the cylindrical portion. Also, the hole plug has advantages such that the liquid entering into the drain hole in such a manner hits the shielding wall, and is repelled (hereinafter, called a repelling operation of the liquid), so that a projection amount does not have to be largely secured unlike the cover portion in the Patent Document 1 so as to easily improve an appearance and provide a weight reduction. Obviously, an attachment operation to the panel can be carried out by one-touch operation by the engagement leg in the same manner as in the Patent Document 1.

In the invention according to the second aspect, the inside of the cylindrical portion and the drain hole communicate with each other through the communication path passing between the inner peripheral face of the cylindrical portion and the shielding wall, and extending to the drain hole through the lower side of the shielding wall, so that the aforementioned liquid entering into the drain hole from the outside becomes difficult to flow into the cylinder inside of the cylindrical portion, and eventually, a flat flange structure can be adopted as the protruding portion.

In the invention according to the third aspect, the shielding wall is provided to have the approximately same height as the cylinder back side of the cylinder inside of the cylindrical portion, or the panel in an attachment state to the panel so as to excellently maintain the aforementioned repelling operation of the liquid.

Figure 4A:
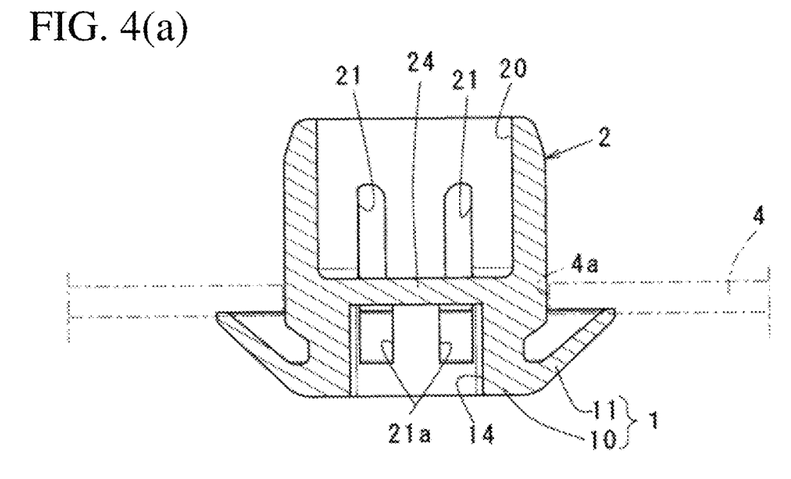
FIGS. 4(a) and 4(b) are a cross-sectional view taken along a line A-A in FIG. 2(a), and a cross-sectional view taken along a line B-B in FIG. 2(b)
Figure 4B:
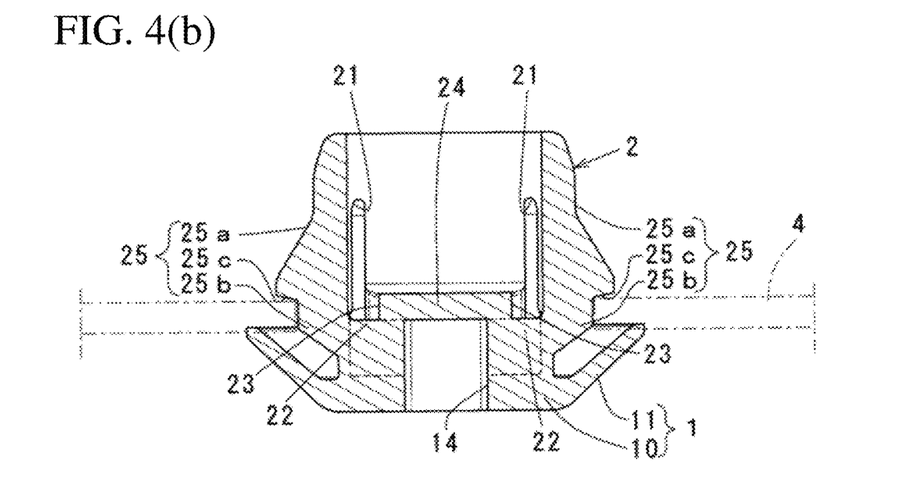
Figure 5:
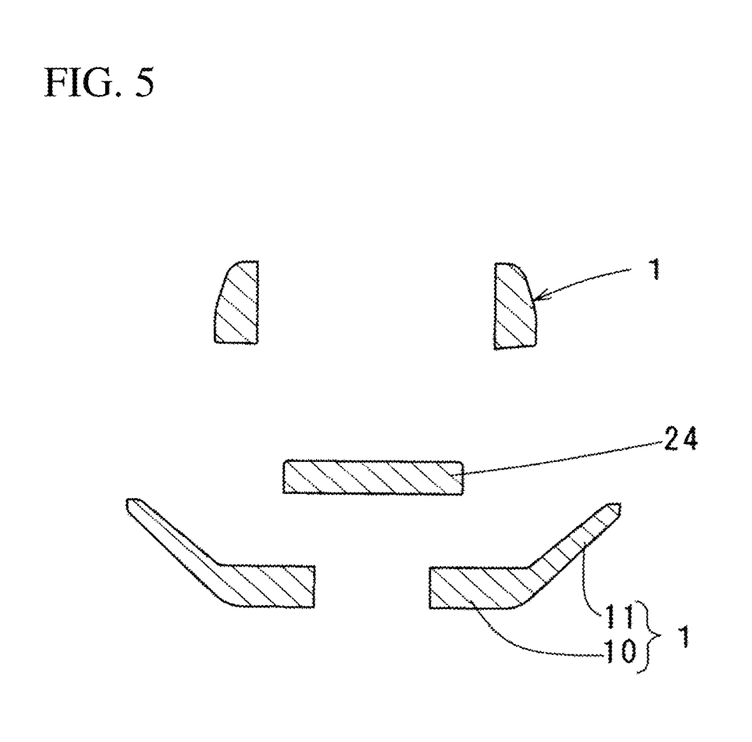
FIG. 5 is a cross-sectional view taken along a line C-C in FIG. 3(a)

In the invention according to the fourth aspect, the engagement leg is divided through the pair of vertical slits in the cylindrical portion, and the tip thereof is connected to the inner face side of the flange, so that, for example, as inferred from a comparison between FIG. 4(b) and FIG. 10(b), an engagement force can be strengthened by suppressing a displacement degree of the engagement leg, and a stability of an engagement state can be improved.

In the invention according to the fifth aspect, the shielding wall is integrally formed by the resin together with the flange and the cylindrical portion so as to be formed while suppressing a processing cost to the minimum. Incidentally, in the integral molding, as inferred from FIG. 6, as for a resin injection forming mold, there are advantages such that the shielding wall can be formed by a molding space divided using at least upper and lower molds for forming the cylinder inside of the cylindrical portion and for forming the drain hole; the communication path according to the second aspect can be formed using a slider mold for forming the vertical slit; and the like.

BRIEF DESCRIPTION OF THE DRAWINGS

FIGS. 1(a) and 1(b) show a hole plug for waste water according to an embodiment of the present invention, wherein

FIGS. 7(a) and 7(b) show a drainage operation of the hole plug, wherein

FIGS. 8(a), 8(b), and 8(c) show the first modified example of the hole plug, wherein

FIGS. 9(a), 9(b), and 9(c) show a second modified example of the hole plug, wherein

DETAILED DESCRIPTION OF THE INVENTION

Hereinafter, an embodiment of the present invention and modified examples thereof will be explained with reference to the drawings. In the explanation, a structure of a hole plug of the embodiment, main operations thereof, the first modified example, and a second modified example will be described in detail in that order.

(Structure) In FIG. 1(a) to FIG. 7(b), a hole plug 3 for waste water is formed by a resin injection molded member, and comprises a flange 1 which is a protruding portion, and a cylindrical portion 2 projecting on an inner face side of the flange 1. The hole plug 3 for waste water is attached in a state wherein the cylindrical portion 2 is inserted to pass through an attachment hole 4a of a vehicle-body-side panel 4 for allowing a liquid such as rainwater and the like entered into an inside of a vehicle to flow into a cylinder inside 20 of the cylindrical portion 2, and to flow out to an outside of the vehicle from a drain hole 14 provided in the flange 1. The feature of the device mainly resides in that the flange 1 has an approximately dish shape, provides the vertical-hole-like drain hole 14, and projects the cylindrical portion 2 on the inner face side; and that the cylindrical portion 2 includes a shielding wall 24 positioned directly above the drain hole 14, and a non-linear communication path 28 communicating the cylinder inside 20 with the drain hole 14 in addition to engagement legs 25 provided in a circumference. Hereinafter, details thereof will be clarified.

The flange 1 comprises a disk-shaped center portion 10 and an umbrella-shaped brim portion 11 integrated with a circumference of the center portion 10. In the center portion 10, there is provided the drain hole 14 near the center. The drain hole 14 communicates with the cylinder inside 20 of the cylindrical portion 2 through the later-described communication path 28. Here, although a shape of the flange 1 is a circular dish shape, the shape of the flange 1 may be an oval dish shape, a rectangular dish shape, and the like. Likewise, although the drain hole 14 has a rectangular parallelepiped hole shape, a cube may be used, and furthermore, a cross-sectional surface may have a polygonal, circular, or oval hole shape. Incidentally, in the example, facing long faces dividing the drain hole 14 are set so as to become a side corresponding to the engagement legs 25 of the cylindrical portion 2.

The brim portion 11 has a circular brim shape, and as shown in FIGS. 7(a) and 7(b), the brim portion 11 is formed to be thinner than the center portion 10. The brim portion 11 has a shape wherein a brim tip thereof closely contacts an outer face of the panel 4 in a state wherein the cylindrical portion 2 engages the attachment hole 4a through the engagement legs 25 so as to prevent the liquid such as rainwater and the like from entering between the brim tip and the panel 4 and unexpectedly entering into the inside of the panel 4 from the attachment hole 4*a*.

The cylindrical portion 2 has a cylindrical shape provided to stand on an inner face of the center portion 10, and integrally includes two engagement legs 25 facing in the circumference; the shielding wall 24 disposed directly above the drain hole 14 at a back side of the cylinder inside 20; the communication path 28 communicating the cylinder inside 20 with the drain hole 14; and the like.

Each engagement leg 25 has an upper end 25*a* connecting to an upper part of the cylindrical portion 2, and a lower end 25*b* connecting to a lower part of the cylindrical portion 2 or the flange 1, and includes an engagement step 25*c* formed to project at an approximately intermediate portion. Also, the engagement leg 25 is divided between vertical slits 21 so as to be elastically displaceable.

In a groove width of each vertical slit 21, as shown in FIG. 4(*a*), a lower part 21*a* which comes close to the center portion 10 is formed to be slightly wider than an upper portion side. This is for ensuring a hole width of horizontal holes 28*b* provided to communicate the drain hole 14 on a lower side of the shielding wall 24 with a predetermined size when the later-described communication path 28 is formed by injection molding.

Important structures are such that the shielding wall 24 is positioned directly above the drain hole 14, and has a size which is one size larger than that of a horizontal cross-sectional surface of the drain hole; the cylinder inside 20 and the drain hole 14 are provided in a state wherein they can communicate with each other through the communication path 28; the hole plug 3 is provided to have a height approximately the same as that of the cylinder back side of the cylinder inside 20, or the panel 4 in a state engaged with the attachment hole 4*a* of the panel through the engagement legs 25; and the like.

Among those, as inferred from FIGS. 7(*a*) and 7(*b*), the size of the shielding wall 24 and the structure provided on the back side of the cylinder inside 20 become useful requirements in order to allow the liquid such as rainwater and the like entered into the drain hole 14 from the outside to be easily repelled by hitting against the shielding wall 24 which is larger than the drain hole 14, and to make the liquid such as rainwater and the like difficult to flow into a cylinder inside 20 side through the communication path 28.

Figure 1A:
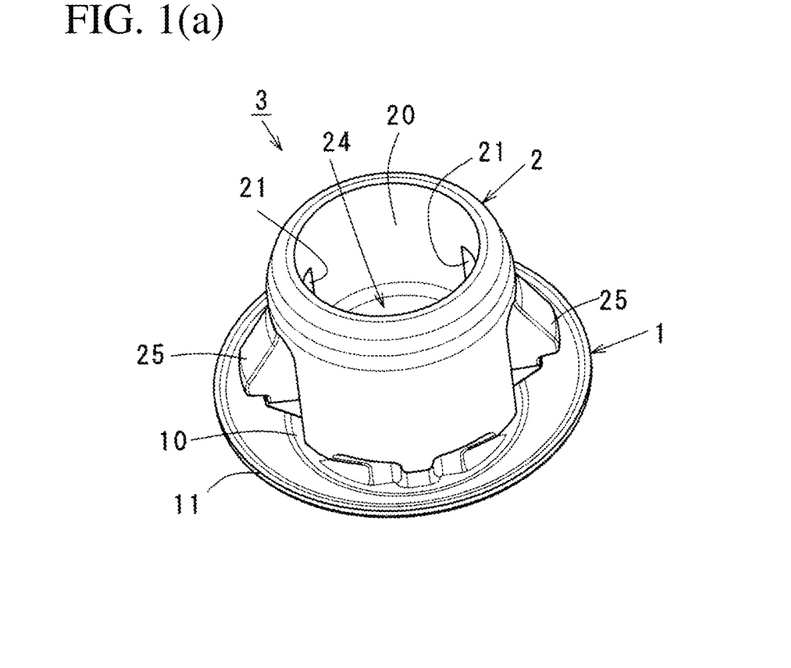
FIG. 1(a) is a schematic external view which is viewed from an upper side.
Figure 1B:
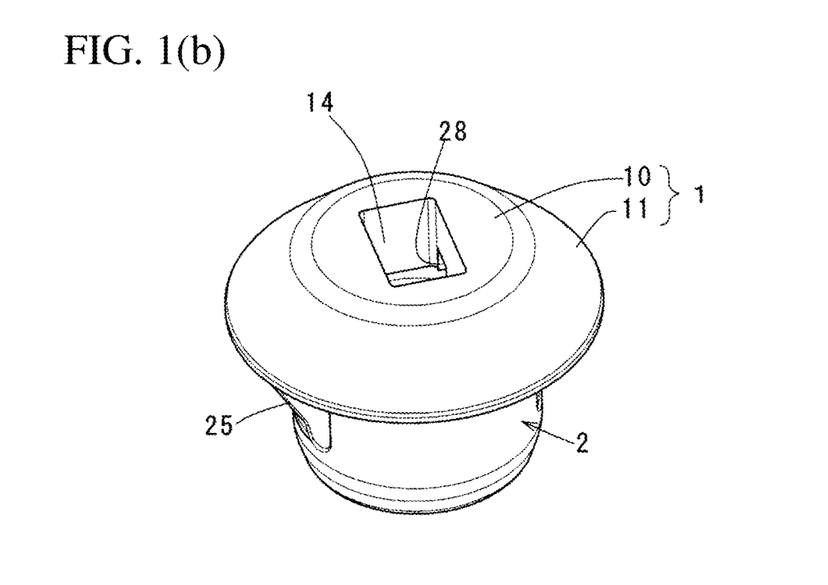
FIG. 1(b) is a schematic external view in a state wherein the upside is turned down.
Figure 2A:
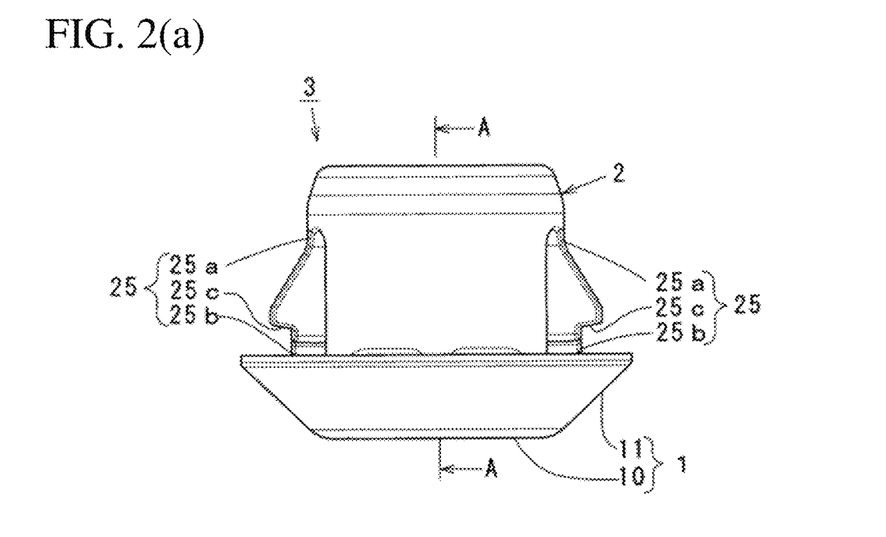
FIGS. 2(a) and 2(b) are a front view and a side view of the hole plug.
Figure 2B:
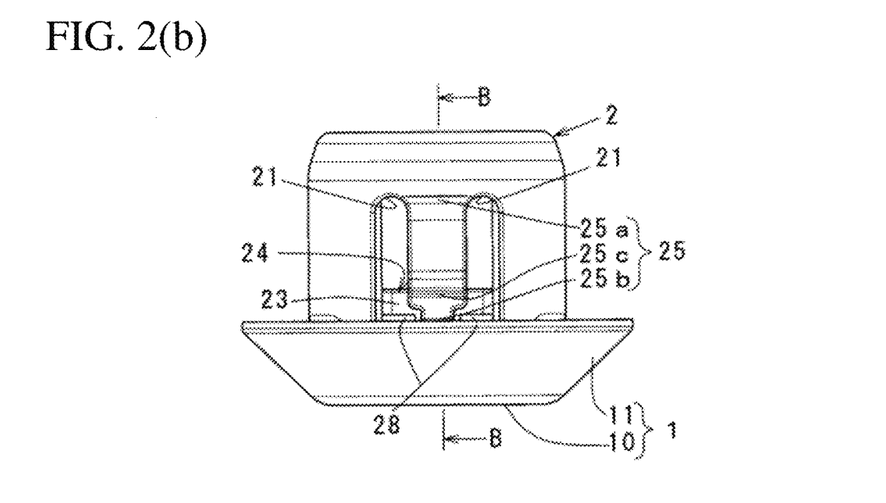
Figure 3A:
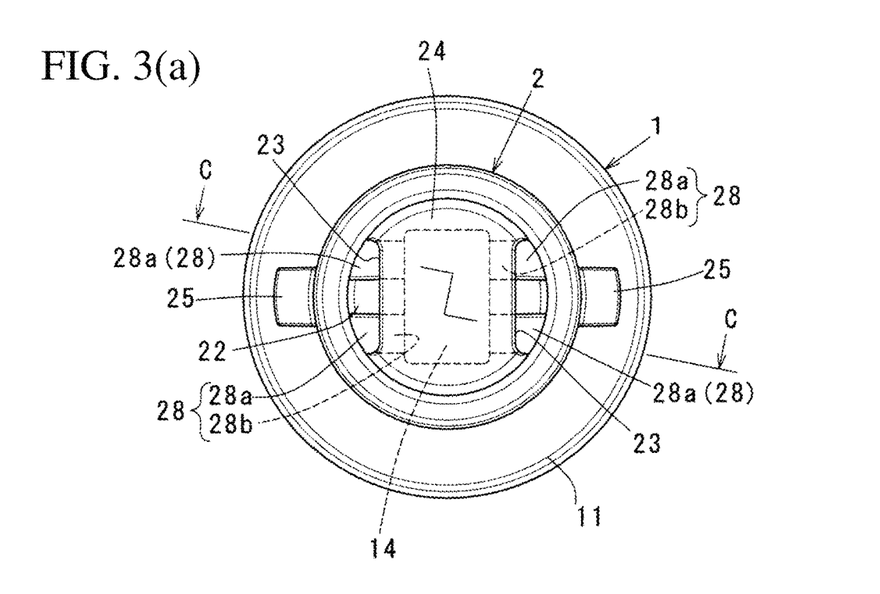
FIGS. 3(a) and 3(b) are a top view and a bottom view of the hole plug.
Figure 3B:
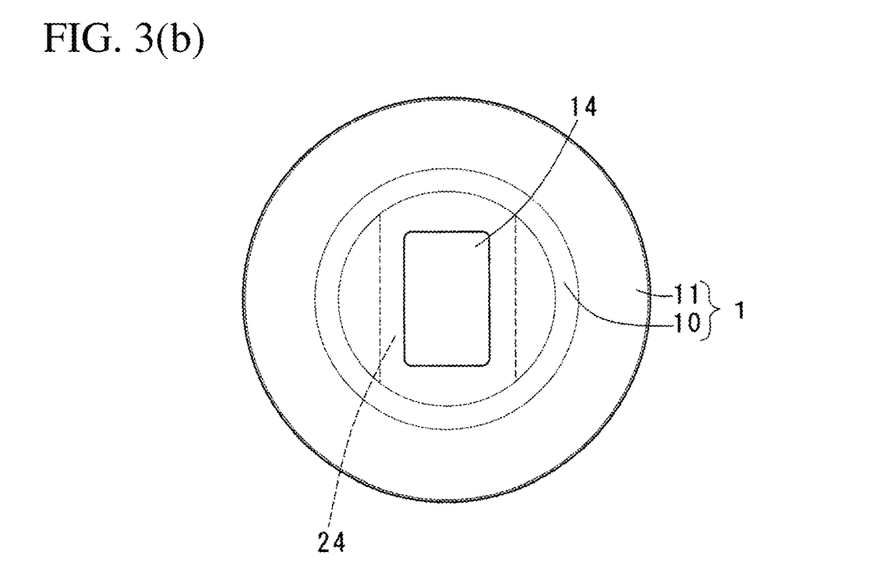

Here, as shown in FIGS. 7(*a*) and 7(*b*), the communication path 28 passes through the cylinder inside 20 and the drain hole passing side faces 23 of the shielding wall 24 from the inside of the cylinder, and extends to the drain hole 14 through the lower side of the shielding wall 24. Specifically, as shown in FIG. 3(*a*) and FIG. 7(*a*), the communication path 28 is formed to be divided by right and left vertical holes 28*a* located at a wall part facing each vertical slit 21, and notched approximately in a D shape between an inner peripheral face of the cylinder inside 20 and the shielding wall 24; and as shown in FIG. 7(*b*), the horizontal holes 28*b* notched to the drain hole 14 through a lower face side of the shielding wall 24 from a corresponding part of the vertical slit 21 on a lower side of each vertical hole 28, of the shielding wall 24.

The vertical holes 28*a* are holes provided between the inner peripheral face of the cylinder inside 20 and the corresponding side faces 23 of the shielding wall 24, and corresponding to a thickness of the shielding wall 24. Two horizontal holes 28*b* are provided in an extended line of each vertical slit 21 on one side on the lower side of each vertical hole 28*a*, and a total of four horizontal holes 28*b* is provided. As shown in FIG. 7(*a*), partition walls 22 divide between the horizontal holes 28*b*. The partition walls 22 are located in the cylinder inside 20, and are wall portions corresponding to the engagement legs 25 provided between the vertical slits 21.

(Operations) Next, main operations of the aforementioned hole plug 3 will be clarified.

Figure 6:
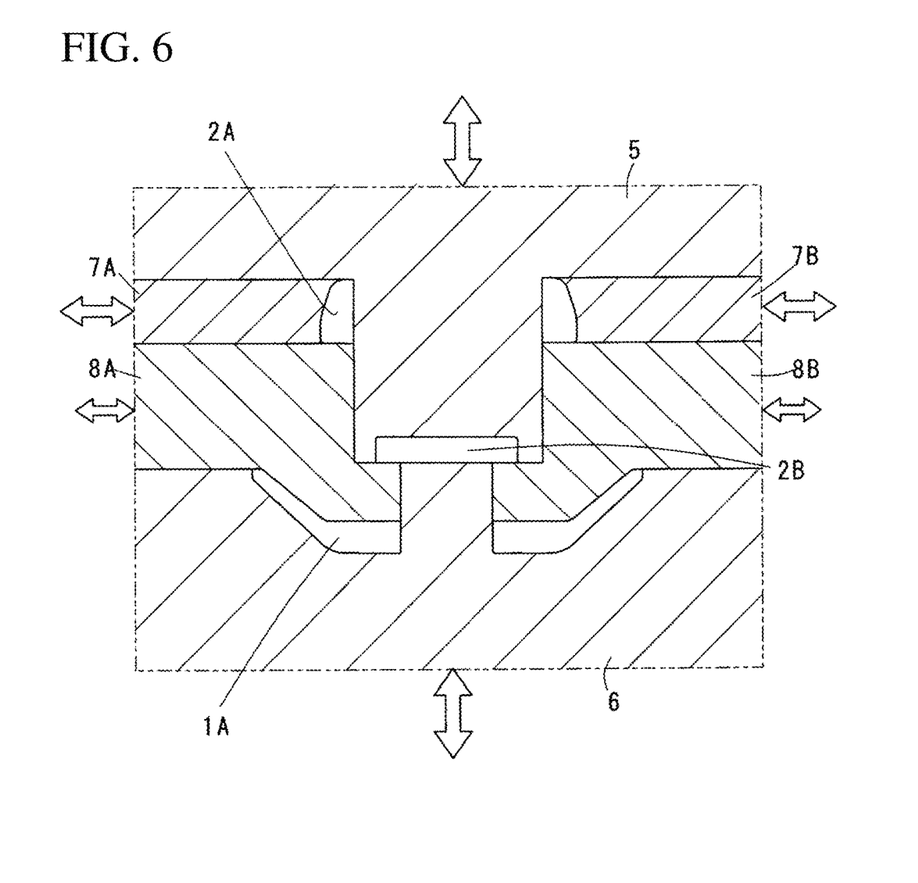
FIG. 6 is a diagram showing essential parts of a molding mold for the hole plug.

(1) The hole plug 3 is molded by resin using an injection forming mold. Consequently, the shielding wall 24 and the communication path 28 are integrally molded by resin together with the flange 1 and the cylindrical portion 2. FIG. 6 shows a mold structure example of a portion corresponding to a cross-section surface in FIG. 5 in the injection forming mold. In the mold structure, the shielding wall 24 is formed by a forming space 2B divided using at least an upper mold 5 for forming the cylinder inside 20 of the cylindrical portion 2 and a lower mold 6 for forming the drain hole 14 of the flange 1. At that time, in the communication path 28, the vertical hole 28*a* can be formed by a tip shape of the upper mold 5. The horizontal hole 28*b* of the communication path 28 can be formed using slider molds 8A and 8B, and the like for forming each vertical slit 21. Therefore, even if the hole plug 3 of the embodiment includes the shielding wall 24 for repelling which is larger than the horizontal cross-sectional surface of the drain hole 14, and the non-linear communication path 28, a mass productivity is excellently maintained so as to excel in a molding performance.

(2) FIGS. 7(*a*) and 7(*b*) show a state wherein the hole plug 3 is attached to the vehicle-body-side panel 4. Namely, in the hole plug 3, in an attachment operation to the panel, when the cylindrical portion 2 is operated to be pushed into the attachment hole 4*a* of the panel, in a middle of being pushed, the engagement leg 25 reduces a diameter and is displaced to the cylinder inside 20 side, and when the engagement leg 25 passes through the attachment hole 4*a*, the engagement leg 25 returns to an original state so as to engage the attachment hole 4*a*, so that as shown in FIG. 7(*b*), the brim portion 10 is held in a state pressed against the panel 4. In an attached use state, the tip of the brim portion 11 presses against the outer face of the panel 4, so that the liquid such as rainwater and the like does not enter into the inside of the brim portion 11 by passing between the brim tip and the panel 4. Also, the engagement leg is divided through a pair of vertical slits 21 in the cylindrical portion 2, and the tip connects to the inner face side of the flange, so that as inferred from a comparison between FIG. 4(*b*) and FIG. 10(*b*), an engagement force can be strengthened by suppressing a displacement degree of the engagement leg, and a stability of an engagement state can be improved.

(3) In the use state of the hole plug 3, when the liquid such as rainwater and the like entered into the inside of the vehicle flows into the cylinder inside 20 of the cylindrical portion 2 through the vertical slit 21 and the like, the liquid such as rainwater and the like can smoothly drain to the outside from the communication path 28 formed by the vertical hole 28*a* and the horizontal hole 28*b* through the drain hole 14 without being obstructed by the shielding wall 24.

(4) Also, in car washing, heavy rainfall, and the like, when water enters into the drain hole 14 from the outside, the water hits against the shielding wall 24 which is provided directly above the drain hole 14 and is larger than the horizontal cross-sectional surface of the drain hole 14, and is repelled so as to reliably suppress entering into the cylinder inside of the cylindrical portion 2. In the hole plug 3, the liquid entering into the drain hole 14 hits against the shielding wall 24, and is repelled, i.e., due to a repelling operation of the liquid, compared to the Patent Document 1, a projection amount to a panel outside does not have to be largely secured so as to easily improve an appearance and provide a weight reduction. Additionally, the shielding wall 24 is provided to have the height approximately the same as that of the cylinder back side of the cylinder inside 20 of the cylindrical portion or the panel 4, so that the repelling operation of the liquid is exerted in an optimum state so as to improve a quality. Furthermore, the communication path 28 is formed by the vertical hole 28a and the horizontal hole 28b so as to be difficult to flow backward compared to a structure of a linear drainage canal.

(Modified Examples) FIGS. 8(a), 8(b), and 8(c), and FIGS. 9(a), 9(b), and 9(c) show the first modified example and a second modified example of the aforementioned hole plug. In the explanation, the same symbols are assigned to the same parts or operationally the same parts as the aforementioned embodiment in order to avoid an overlapped description as little as possible, and differences will be clarified.

Figure 8A:
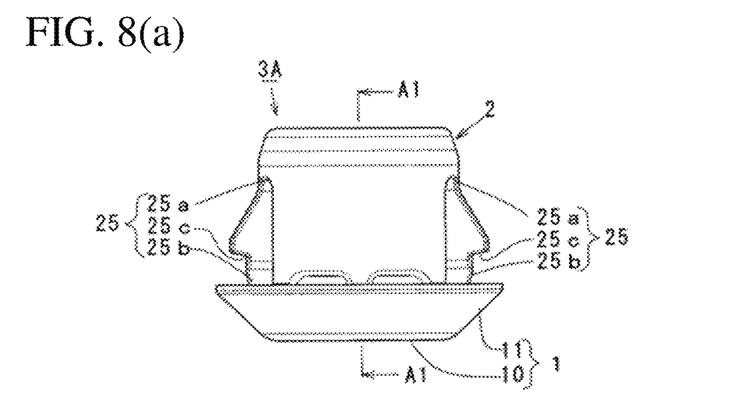
FIG. 8(a) is a front view.
Figure 8B:
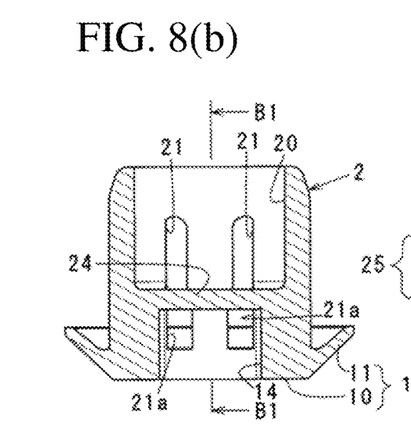
FIG. 8(b) is a cross-sectional view taken along a line A1-A1 in FIG. 8(a)
Figure 8C:
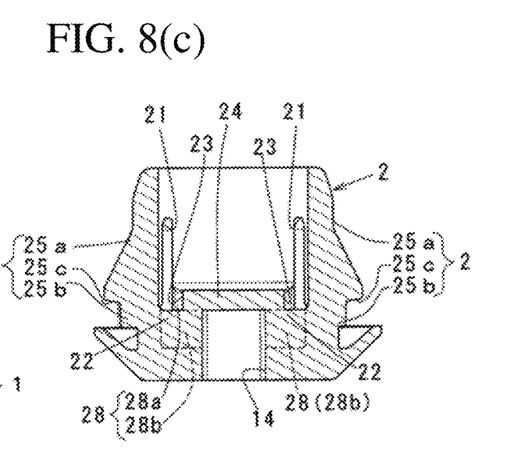
FIG. 8(c) is a cross-sectional view taken along a line B1-B1 in FIG. 8(b)

In a hole plug 3A of the first modified example shown in FIGS. 8(a), 8(b), and 8(c), the brim portion 11 of the flange 1 is formed to be shorter than the aforementioned embodiment. In that case, in the injection forming mold in FIG. 6, it is the same as the aforementioned embodiment in that the horizontal hole 28b of the communication path 28 is formed using the slider molds 8A and 8B for forming each vertical slit 21, and the like, however, for example, compared to the aforementioned embodiment, a sliding friction in a punching operation of the slider molds 8A and 8B after the injection molding can be easily reduced.

Figure 9A:
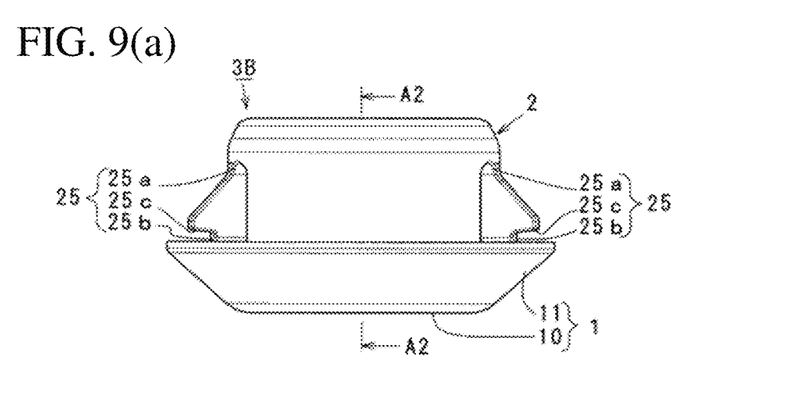
FIG. 9(a) is a front view.
Figures 9B, 9C:
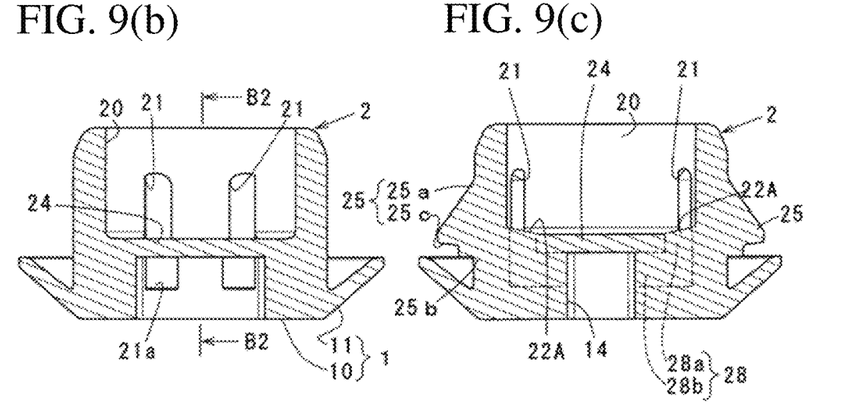
FIG. 9(b) is a cross-sectional view taken along a line A2-A2 in FIG. 9(a)
FIG. 9(c) is a cross-sectional view taken along a line B2-B2 in FIG. 9(b)

On the other hand, in a hole plug 3B of the second modified example shown in FIGS. 9(a), 9(b), and 9(c), the brim portion 11 of the flange 1 is formed to be relatively longer. Also, a partition wall 22A divides between the horizontal holes 28b forming the communication path 28 as shown in FIG. 9(c). The partition wall 22A is formed to be higher than the partition wall 22 of the embodiment and the first modified example, and has an approximately same height as an upper face of the shielding wall 24. In that case, for example, in the injection forming mold in FIG. 6, a shape of a tip of a projecting portion for forming the inside of the cylinder, which projects in a center portion of the upper mold 5, is changed so that an end face becomes approximately a flat surface.

As mentioned above, details of the present invention can be modified or developed further with reference to the aforementioned embodiment or respective modified examples provided that they have a structure specified in the invention. As for an example of a cylinder inside shape of the cylindrical portion, for example, as shown in the Patent Document 1, the cylinder inside shape of the cylindrical portion may be partitioned into a plurality of cavity portions. Also, as for a plug shape, the flange may be formed in a rectangular shape, or the cylindrical portion may be formed in a rectangular cylinder shape. Also, the engagement leg is not limited to a leg shape, and may be formed as a small projection shape provided that the engagement leg is provided in the circumference of the cylindrical portion and is formed to detachably engage the attachment hole of the panel. On the other hand, an application of the present invention is not limited to an automobile, and may be applied to, for example, agricultural machines and implements or tractors for civil engineering works, and furthermore, other vehicles as for a car body.

The disclosure of Japanese Patent Application No. 2017-188671, filed on Sep. 28, 2017, is incorporated in the application.

While the invention has been explained with reference to the specific embodiments of the invention, the explanation is illustrative and the invention is limited only by the appended claims.

What is claimed is:

1. A hole plug for waste water, comprising:
   a protruding portion including
      a flange having a dish shape, and
      a drain hole in the flange; and
   a cylindrical portion projecting from an inner face of the flange, and including
      a shielding wall arranged above the drain hole in a space inside the cylindrical portion to communicate with the space and the drain hole and having a horizontal cross-sectional area larger than that of the drain hole to cover the drain hole,
      an engagement leg formed on an outer circumference of the cylindrical portion and configured to be detachably engaged into an attachment hole of a panel, and
      a pair of slits formed at sides of the engagement leg and extending to the inner face of the flange through the shielding wall,
   wherein the cylindrical portion is configured to be inserted into and pass through the attachment hole of the panel, and
   the space inside the cylindrical portion and the drain hole communicate with each other for allowing a liquid entering into an inside of a vehicle to flow into the space inside the cylinder portion and flow out to an outside of a vehicle from the drain hole.

2. A hole plug for waste water according to claim 1, wherein the cylindrical portion further includes a path located in the space inside the cylindrical portion, passing between an inner peripheral face of the cylindrical portion and the shielding wall, and extending to the drain hole through a lower side of the shielding wall to communicate the space inside the cylindrical portion and the drain hole.

3. A hole plug for waste water according to claim 1, wherein the shielding wall is positioned at a height substantially same as that of a lower side of the cylindrical portion or the panel in a state wherein the cylindrical portion engages the attachment hole of the panel through the engagement leg.

4. A hole plug for waste water according to claim 1, wherein the engagement leg is divided through the pair of vertical slits in the cylindrical portion, and a tip thereof is connected to the inner face of the flange.

5. A hole plug for waste water according to claim 1, wherein the shielding wall is integrally formed by resin together with the flange and the cylindrical portion.

6. A hole plug for waste water according to claim 1, wherein the space inside the cylindrical portion includes, as a path communicating with the space and the drain hole, a vertical hole between an inner peripheral face of the cylindrical portion and a side face of the shielding wall and a horizontal hole between the inner face of the flange and a lower face of the shielding wall.

7. A hole plug for waste water according to claim 6, wherein each of the pair of slits includes a first portion at an upper portion thereof and a second portion at a lower portion thereof, the second portion being formed outside the horizontal hole and having a width wider than that of the first portion, and the cylindrical portion further includes a partition wall arranged between the lower face of the shielding wall and the inner face of the flange, and dividing the horizontal hole into two holes.

8. A hole plug for waste water according to claim 1, wherein the shielding wall is vertically apart from the drain hole in the space inside the cylindrical portion to communicate with the space and the drain hole, and the drain hole is a penetrating hole located at a center of the protruding portion.

* * * * *